J. A. FRIDDLE.
FRICTION CLUTCH.
APPLICATION FILED MAR. 25, 1910.
983,433.
Patented Feb. 7, 1911.
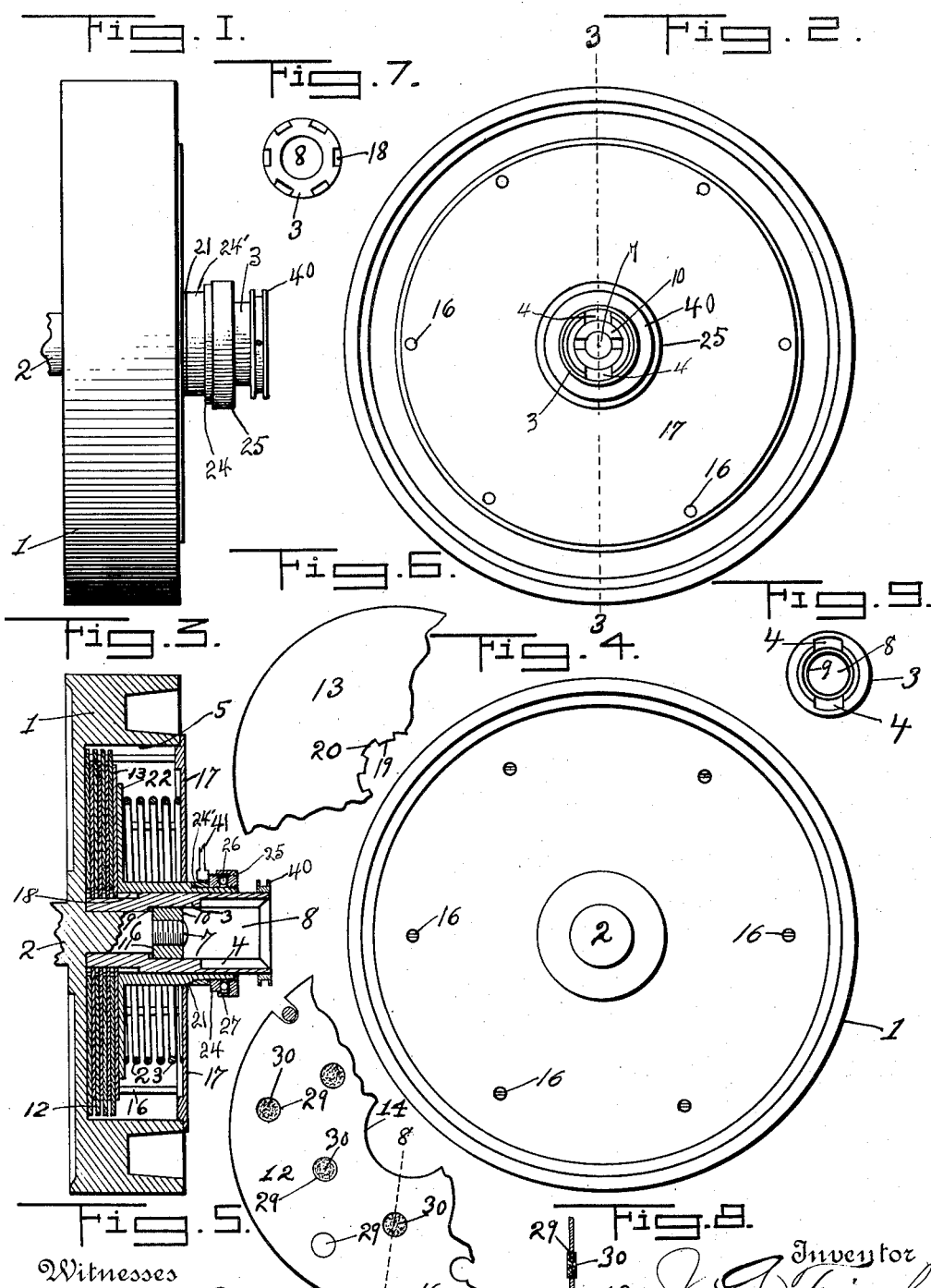

UNITED STATES PATENT OFFICE.

JAMES A. FRIDDLE, OF POMEROY, WASHINGTON.

FRICTION-CLUTCH.

983,433.    Specification of Letters Patent.    Patented Feb. 7, 1911.

Application filed March 25, 1910. Serial No. 551,514.

*To all whom it may concern:*

Be it known that I, JAMES A. FRIDDLE, a citizen of the United States, residing at Pomeroy, in the county of Garfield and State of Washington, have invented certain new and useful Improvements in Friction-Clutches, of which the following is a specification.

This invention relates to improvements in friction clutch and more especially to that class of such devices in which friction disks are employed.

Among the many objects of this device is the provision of a clutch that is exceedingly simple in its construction and is comparatively inexpensive to manufacture, while at the same time added efficiency and strength are present in its construction.

The present structure provides a means whereby any machinery may be given a slow and steady start and my device obviates all sudden jerk and jar from all the gearing as well as the car and passengers when used in connection with an automobile engine.

This clutch does not depend upon oil or a lubricant for its perfect operation but upon the novel construction of disks employed; these consist of separate steel and bronze plates which are alternately arranged, while the bronze plates are each provided with a plurality of cork inserts which effectually prevent the clutch from rattling when the plates are released for action upon the change of gears.

A still further object of the device is the provision of a ball-bearing releasing hub or collar and the employment of a single helical actuating spring encircling the power shaft and wholly inclosed within the clutch casing.

With these general objects in view and others that will appear as the nature of the invention is better understood, the improvement consists in the novel combination, formation and arrangement of parts fully described herein, illustrated in the accompanying drawings and pointed out in the appended claims.

In the drawings forming a part of this application, and in which like designating numerals refer to like parts throughout the several views,—Figure 1 is a plan view of the assembled device, Fig. 2 is an end elevation of the same, Fig. 3 is a vertical section on line 3—3 of Fig. 2, Fig. 4 is an end elevation opposite to that shown in Fig. 2, Fig. 5 is a fragmentary view of one of the bronze plates, Fig. 6 is a fragmentary view of one of the steel plates, Fig. 7 is a bottom view of the clutch driving coupling, Fig. 8 is a section on line 8—8 of Fig. 5, and, Fig. 9 is a top view of the clutch driving coupling.

Referring in detail to the drawings, I provide the circular gear case 1, here shown in the form of a hollow pulley and which constitutes the driving element, while an integral driving shaft is represented at 2. The only part of the driven shaft here represented is the coupling tubular member 3 to which the main driven shaft of the machinery upon which the clutch is employed is secured in any well-known manner, such for instance, as the fitting of the blocks of a universal joint within the mortise 4 of the clutch driver. The circular chamber 5 within the casing 1 is designed for the accommodation of the clutch members and centrally thereof and preferably integral with the casing 1 is provided the stub shaft 6 having a reduced screw-threaded end 7. The said connecting member or clutch driver 3 being provided with the bore 8 has an inner shoulder 9 formed by reducing the size of the bore 8. Said reduced bore is adapted to receive the stub shaft 6 while the nut 10 upon the screw-threaded portion 7 becoming seated upon the shoulder 11, secures the clutch driver or coupling member 3 upon said stub shaft 6 in a manner allowing free rotation of the relative members. A boot-ring 40 is secured upon the outer end of the tubular coupling member 3.

Two sizes of friction disks are employed, the bronze friction disk 12 being the larger and the steel disk 13 being of slightly less diameter, while a plurality of each kind of disks alternately arranged are threaded upon the end of the coupling member 3, which is within the chamber. The bronze disks 12 being of the greater diameter are provided with a comparatively large central circular opening 14 of slightly greater diameter than the outer periphery of the coupler 3, which renders impossible any friction between the disks 12 and the member 3. The said bronze disks are provided at their outer periphery with a plurality of notches 15 which are adapted to receive the bolts 16 which pass through the rear wall of the casing 1 and are screw-threaded into the cover plate 17 provided for the chamber 5 and by which means it will be readily seen that the disks 12 while capable of free longitudinal movement are locked to revolve only with the casing 1. The inner end of the coupler 3 is provided with a plurality of regularly-arranged squared slots 18 positioned longitudinally thereof and which are adapted to receive the teeth 19 arranged upon the inner opening 20 of the steel disks 13 and by which arrangement it will be noted that the steel disks 13 are locked for rotary movement with the said coupling member 3, while such disks are free to move longitudinally to an extent limited only by the length of said receiving slots 18.

Upon the coupler member 3 is arranged the tubular releasing hub 21 arranged at its inner end and within the chamber 5 with an annular flange 22 which is normally spring-pressed against the disks by a strong helical spring 23 which entirely encircles said hub and being seated upon the flange 22 also abuts the closure plate 17. The outer end of said releasing hub 21 has screw-threaded thereon the ball-bearing cone 25 provided with a race-way to accommodate the anti-friction ball members 26 and a companion cone collar 24 is loosely mounted upon said hub end and is provided with a corresponding race-way. Said cone member having an inner projecting flange 27 thus furnishes a protecting covering for the bearing. Said collar member 24 is adapted to abut against a ring 24' mounted upon the hub or said ring may be dispensed with and the collar 24 abut directly against a shoulder upon the hub. The essentials of this construction are the firmly securing of the member 25 upon the hub and the freely mounting of the collar 24 in coöperative relation therewith to position the anti-friction bearings and by reason of the freely mounting of the collar 24 affording a friction-reducing means for releasing the clutch when the arm member 41 of the releasing-lever is brought in contact therewith in its operative movement, all of which will be evident from an inspection of Fig. 5 of the drawings.

From the above description, the operation of the device is believed to be evident without further comment, it being noted that the bronze plates being locked with the driving member 1 while the intermediate steel plates 13 are locked with the driven member or coupler 3 and the coil spring 23 being employed which normally holds the parts in the clutched position, it is evident that an outward impulse imparted to the releasing hub 21 by means of a foot pedal lever contacting the collar 24 results in separating the disks and the consequent releasing of the clutch or a freeing of the driving from the driven member.

It is to be noted that it is of the essence of this invention to provide a structure of friction disk, which will be noiseless and will be cushioned together so that a gradual engagement of the plates will be accomplished. For this purpose, I provide in the bronze disks 12 a plurality of perforations 29 which receive inserts 30 of a cushioning substance, preferably cork and these cork members extending slightly from said perforations upon either side of the disks, engage with the faces of the contiguous steel plates and thus accomplish the result desired. Although these cork members may be employed in either the bronze or the steel plates, it is evident that only one set of plates can be provided with such projecting cushions in an arc of the same radius, although such provision might be made upon each set of disks by employing arcs of relatively different radii. It is further noted that the steel disks 13 lie between and do not conflict with the bolts 16.

While the forms of my invention herein shown and described are what are believed to be preferable embodiments thereof, it is nevertheless to be understood that minor changes may be made with respect to form, proportion, size and details of construction without however, departing from my invention as specifically set forth in the appended claims.

Having thus fully described my invention and in what manner the same is designed for use, what I claim as new and desire to secure by Letters Patent of the United States is:

1. A clutch comprising a driving member having an integral stub shaft projecting therefrom, a coupling member revolubly mounted upon said stub shaft, a plurality of bronze plates revoluble with said driving member, and a plurality of steel plates revoluble with said coupling member, a releasing hub provided on said coupling member, an annular inner flange provided upon said releasing hub, and a single resilient member normally engaging said flange and holding said plates into engagement with each other.

2. A clutch comprising a driving member having an integral stub shaft projecting therefrom, a coupling member revolubly mounted upon said stub shaft, a plurality of bronze plates revoluble with said driving member, a plurality of steel plates revoluble with said coupling member, a releasing hub provided on said coupling member, an annular inner flange provided upon said releasing hub, a single resilient member normally engaging said flange and holding said plates into engagement with each other, ball-bearing cones positioned upon the outer end of said releasing hub and one of said cones adapted to be engaged by a clutch-actuating means.

3. A clutch comprising a driving member having a stub shaft projecting therefrom, a coupling member revolubly-mounted upon said stub shaft, a plurality of plates revoluble with said driving member, a plurality of plates revoluble with said coupling member, a releasing hub provided on said coupling member, an annular inner flange provided upon said releasing hub, a single resilient member normally engaging said flange and holding said plates into engagement with each other, a cone member screw-threaded to the outer end of said releasing hub, a collar loosely-mounted upon said hub, anti-friction members positioned between said collar and cone, and said collar adapted to be engaged by a clutch-releasing member.

In testimony whereof I affix my signature in presence of two witnesses.

JAMES A. FRIDDLE.

Witnesses:
W. M. RICHARDSON,
F. E. PALMER.